US006386590B1

(12) United States Patent
Fabel

(10) Patent No.: US 6,386,590 B1

(45) Date of Patent: May 14, 2002

(54) METER TAPE AND ADDRESS LABELS FOR NON-IMPACT PRINTER

(76) Inventor: Warren M. Fabel, 961 Iris Dr., Delray Beach, FL (US) 33483

( * ) Notice: Subject to any disclaimer, the term of this patent is extended or adjusted under 35 U.S.C. 154(b) by 0 days.

(21) Appl. No.: 09/172,593

(22) Filed: Oct. 14, 1998

Related U.S. Application Data

(63) Continuation-in-part of application No. 09/102,852, filed on Jun. 23, 1998, which is a continuation-in-part of application No. 09/097,246, filed on Jun. 12, 1998, which is a continuation-in-part of application No. 08/049,946, filed on Apr. 20, 1993, now Pat. No. 5,836,622.

(60) Provisional application No. 60/087,595, filed on Jun. 1, 1998.

(51) Int. Cl.[7] .......................... B65D 27/06; B42D 15/02; G09F 3/04; B32B 7/04

(52) U.S. Cl. .............................. 283/62; 283/51; 283/71; 283/79; 283/80; 283/81; 283/116

(58) Field of Search .............................. 283/51, 71, 79, 283/80, 81, 116

(56) References Cited

U.S. PATENT DOCUMENTS 4,418,865 A 12/1983 Bowen
4,682,793 A 7/1987 Walz
4,865,669 A 9/1989 Schmidt
4,885,198 A 12/1989 Kimura
5,173,081 A 12/1992 Greig
5,183,203 A 2/1993 Sanders
5,501,393 A 3/1996 Walz
5,573,277 A 11/1996 Petkovsek
5,664,725 A 9/1997 Walz
5,697,648 A 12/1997 Petkovsek
5,746,450 A 5/1998 Petkovsek
5,836,622 A * 11/1998 Fabel ......................... 283/116

FOREIGN PATENT DOCUMENTS

JP 0007398 1/1991

* cited by examiner

*Primary Examiner*—Willmon Fridie, Jr.
*Assistant Examiner*—Mark T. Henderson

(57) ABSTRACT

A template sheet forming postal meter labels or combination postal meter/address labels are described upon which postal indicia can be printed, by a non-impact printer, less than one-quarter inch from the edge of the label. The sheet includes a plurality of removably affixed meter tape or meter tape/address labels positioned in an off-set configuration on one face of a laminated sheet. The combination meter tape/address labels are self-aligning for conforming to United States Postal Service IBIP specifications.

12 Claims, 7 Drawing Sheets

METER TAPE AND ADDRESS LABELS FOR NON-IMPACT PRINTER

CROSS-REFERENCE TO RELATED APPLICATIONS

This application is a continuation-in-part of Applicant's pending U.S. provisional patent application Ser. No. 60/087,595, filed Jun. 1, 1998, and U.S. patent application Ser. No. 09/102,852, filed Jun. 23, 1998, which is a continuation-in-part of Ser. No. 09/097,246, filed Jun. 12, 1998, which is a continuation-in-part of Ser. No. 08/049,946, filed Apr. 20, 1993, now U.S. Pat. No. 5,836,622.

BACKGROUND OF THE INVENTION

This invention relates generally to postal meter tape and address labels, and more specifically, to meter tape or combination meter tape/address labels which can be printed with information or coding in accordance with United States Postal Service requirements.

Non-impact printers, such as laser or ink-jet printers, are being increasingly used to provide a fast, economical, and convenient method for printing data developed within computer systems and stored in databases. In most organizations, preparing and distributing mail represents a significant effort. In addition, the United States Postal Service (USPS) is automating its postage application procedures. With this automation, the USPS has developed strict specifications under its Information Based Indicia Program (IBIP) for certain indicia provided on an envelope to be mailed. For example, the USPS has set requirements for the size and location of various indicia including, but not limited to, the two-dimensional information based indicia (IBI) code, address format, POSTNET bar code location, and the facing identification mark (FIM).

A FIM pattern is required on all IBI mail pieces. A FIM clear zone must contain no printed matter other than the FIM pattern. FIM bars must be between ½" and ¾" high and 0.03125 (1/32 of an inch) ±0.008" wide. The specifications further require that the FIM area be 1¼" wide x⅝" high. The left side of FIM clear zone must be 3" from the right edge of the envelope and the right edge of the FIM clear zone must be between 1⅞"–2⅛" from the right edge of the envelope, preferably 1¾".

The use of non-impact printers, especially certain laser printers, which cannot print less than ¼" from the edge of a page, can be disadvantageous in view of the requirement that the FIM is no more than ⅛" from the top of an envelope or other mail piece. Because the printing of indicia no more than ⅛41 from the edge of an envelope face is not limited to the FIM, a standard envelope or meter tape label fed through a non-impact printer will not meet the USPS IBIP indicia placement requirements. Therefore, the task of automating the printing of envelopes or other postal forms using a non-impact printer can present a problem in meeting the USPS requirements.

BRIEF SUMMARY OF THE INVENTION

It is an object of the subject invention to provide postal meter tape label on which indicia can be printed by a non-impact printer ⅛" or less from the edge of the meter tape label 50 that the specifications and requirements of the Information Based Indicia Program (IBIP) effected by the United States Postal Service (USPS) can be met. More specifically, it is an object of the subject invention to provide a laminated sheet comprising a plurality of postal meter tape labels which can be printed to conform to the USPS IBIP specifications.

It is a further object of the invention to provide a combination postal meter tape and address label formed as a unitary article. The combination meter tape/address label can be provided as a laminated sheet comprising at least two layers, and said sheet can include a plurality of labels. Postal indicia can also be printed by a non-impact printer at a position of ⅛" or less from an edge of the subject combination meter tape/address label.

In the embodiment concerning the meter tape label sheet, two sets of postal meter tape labels can be formed on a single sheet, one set on each of a first and second half of the sheet relative to the central longitudinal axis of said sheet. Preferably, the postal meter tape label sheet can be fed through an auxiliary envelope feeder tray of a non-impact printer. In use, printing occurs on a label situated or configured on the first, or left, half of the central longitudinal axis of said label sheet. The meter tape labels are positioned on the sheet in an offset configuration such that an at least ⅛" margin, preferably an approximately ¼" margin, is provided between the leading edge, relative to the feed direction, of this left half of the sheet and the leading edge of the meter tape label. A margin of at least ⅛", and preferably an least approximately ¼" margin, is also provided on the left edge of the sheet. In the preferred embodiment, the margins form an inverted L-shaped border along a leading and left edge of the sheet, respectively corresponding to the leading and top edges of each label. In an embodiment comprising a plurality of labels formed on one half of the sheet, the left margins bordering the top edge of each label on that half of the sheet can be coextensive. Thus, the L-shaped margins bordering the labels on one half of a sheet together form an F-shaped margin. The trailing edge of the left side of the sheet and the meter tape label can be coextensive, i.e., no margin or border is present.

When the sheet is reversed or rotated 180°, the second, or right, half of the meter tape label sheet then becomes the left half of the meter tape label sheet. Accordingly, the meter tape labels are configured on this second half of the meter tape label sheet in the same fashion as the first half of the meter tape label sheet. Specifically, an approximately ¼" margin is provided on the leading and left edges, relative to the feed direction, of the meter tape label sheet. This configuration provides for printing postal indicia within about ⅛" or less of an edge of a meter tape label.

In the combination meter tape/address label embodiment, postage indicia, a FIM mark, and address information can also be printed on a single face of the sheet, wherein the indicia is automatically positioned and aligned in accordance with USPS standards. The meter tape/address label includes a tab which wraps around and folds over the right edge of an envelope in a face-up position, thereby providing a means for ensuring proper alignment and position. One advantage of the unitary article is that the POSTNET bar code and the two-dimensional IBI code are printed on a single label and are never separated.

The combination meter tape/address label article further comprises a separable border along the top edge of the label to offset printing so that a FIM mark can be printed ⅛" or less from that top edge, and thereby positioned ⅛" or less from the top edge of the envelope. The combination meter tape/address label can also include an alignment mark or guide to ensure proper placement and alignment of the label on the envelope.

Preferably, the meter tape/address label is provided on a sheet which is sized such that the sheet can be fed into a non-impact printer via an envelope feeder tray. More preferably, the sheet can include a plurality of meter tape/address labels.

The label sheets of the subject invention comprise at least two layers which are laminated together: a first, top layer and a second layer which forms a backing or carrier for the overlying top layer. The label sheets can be die-cut in the top layer in particular configurations to achieve the advantages as described. The first top layer preferably can include an adhesive material disposed on its back face. Preferably, pressure-sensitive adhesive material, which is well-known and understood in the art for use with labels, is disposed on the back face of the top layer such that a perimeter margin of about 1/16" to about 1/8" of adhesive-free area is provided to allow for oozing or "bleeding" of the adhesive when exposed to heat from a laser printer.

The carrier layer can be deposited with adhesive-release material, e.g., silicone release material, on its front face which contacts the top layer. Preferably, the release material is deposited in a particular predetermined pattern ("patterned release") so as to come into contact with or engage only the portion of the top layer forming the meter tape or address label so the label can be removed from the backing layer. Thus, certain margins or border areas of the top layer can be made non-releasable and remain substantially permanently affixed to the carrier layer. Alteratively, the adhesive-release material can fully coat the front face of the carrier layer.

Advantageously, the subject invention provides a rapid and convenient article and method for printing postal indicia on a meter tape label or combination meter tape/address label in accordance with USPS IBIP specifications and which can be perfectly aligned on an envelope. In use, a sheet comprising the label or labels is printed on a non-impact printer, the backing layer and any non-used border area is removed from the top layer to expose adhesive disposed on the back face of the top layer, and the label is adhered to the mailpiece, e.g., an envelope, in a particular alignment such that certain indicia, e.g., the FIM mark is placed in proper position in accordance with the requirements of the USPS.

BRIEF DESCRIPTION OF THE DRAWINGS

FIG. 6A shows an embodiment wherein the label tape is configured on the left half of the sheet. FIG. 6B shows an embodiment wherein the label layer is configured on the right half of the sheet.

FIG. 11A shows a back face of the subject article; FIG. 11B shows a back face of the subject article aligning the tab portion along the edge of an envelope; FIG. 11C shows the front face of the meter tape/address label as applied to an envelope.

DETAILED DESCRIPTION OF THE PREFERRED EMBODIMENTS

The subject invention can be understood by reference to the accompanying drawings.

Figure 1:
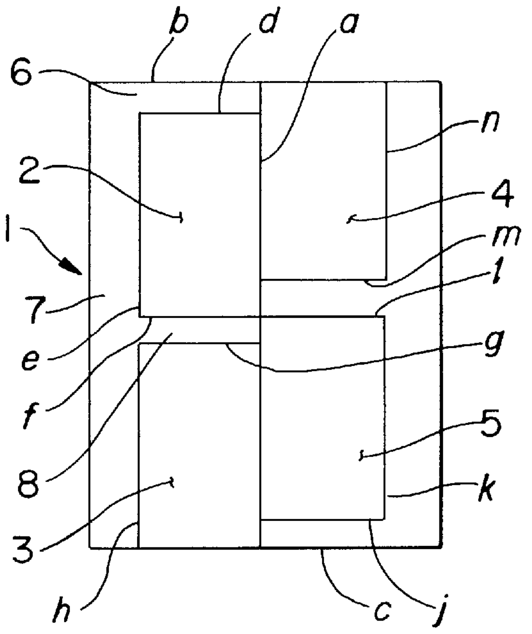
FIG. 1 shows a plan view of a top face of one embodiment of the article of manufacture according to the subject invention, illustrating an offset configuration for a plurality of postal meter tape labels.

FIG. 1 shows a plan view of a front face of one embodiment of the postal meter tape label sheet 1 according to the subject invention, illustrating die-cut lines a, d, e, f, g, h, j, k, l, m, and n, forming an offset configuration of a plurality of postal meter tape labels 2–5. A first die-cut line a extends from a top edge b of the label sheet 1 along a central longitudinal axis to a bottom edge c of the label sheet 1, dividing said label sheet into left and right halves.

Further die-cuts can be made in each half of the sheet to form a plurality of labels 2–5. For convenience, the subject invention is described by referring to the left half of the sheet comprising die-cut lines d-h, forming labels 2 and 3 having borders 6, 7, and 8 around three edges of label 2 and two edges of label 3. These borders 6, 7, and 8 advantageously allow a non-impact printer, e.g., a laser printer, to print indicia flush with an edge of the label. The labels formed on the left side of the sheet are configured such that border 8 forming a bottom margin of label 2 is coincident as a top border for label 3. Border 7 extends along edge e of label 2, across the width of border 8, and along edge h of label 3. The bottom edge of label 3 is coincident with bottom edge c of the label sheet 1. Thus, an "F" shaped border is formed by the die-cuts on the left side of the label sheet 1.

Die-cuts are made in the right side of label sheet 1 to form labels 4 and 5 in a similar manner and configuration, except that the right side is reversed and inverted in relation to the left side.

Figure 2:
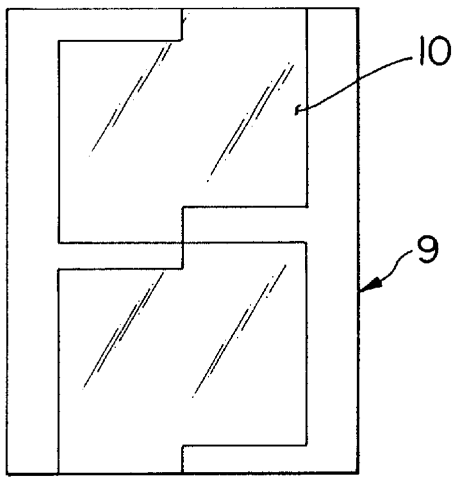
FIG. 2 shows a plan view of a top, or inside, face of the second, carrier layer of one embodiment of the article according to the subject invention, illustrating a patterned configuration of the adhesive-release material covering an area of said front face of said second layer.

FIG. 2 shows a plan view of a top, or inner, face of the second, or carrier, layer 9 of one embodiment of the subject label sheet. The top face of carrier layer 9, which contacts the back face of the front layer when the top and carrier layers are laminated together, is shown having a patterned configuration of adhesive-release material 10 disposed on the top face of said carrier layer. Adhesive-release material 10 can be disposed in a configuration which matches the position of labels 2–5 formed on the first top layer of the label sheet or can be disposed to cover substantially the entire front face of the carrier layer (not shown). In a preferred embodiment, the area of the carrier layer 9 conforming to the F-shaped borders of the top layer is free of adhesive-release material.

Figure 3:
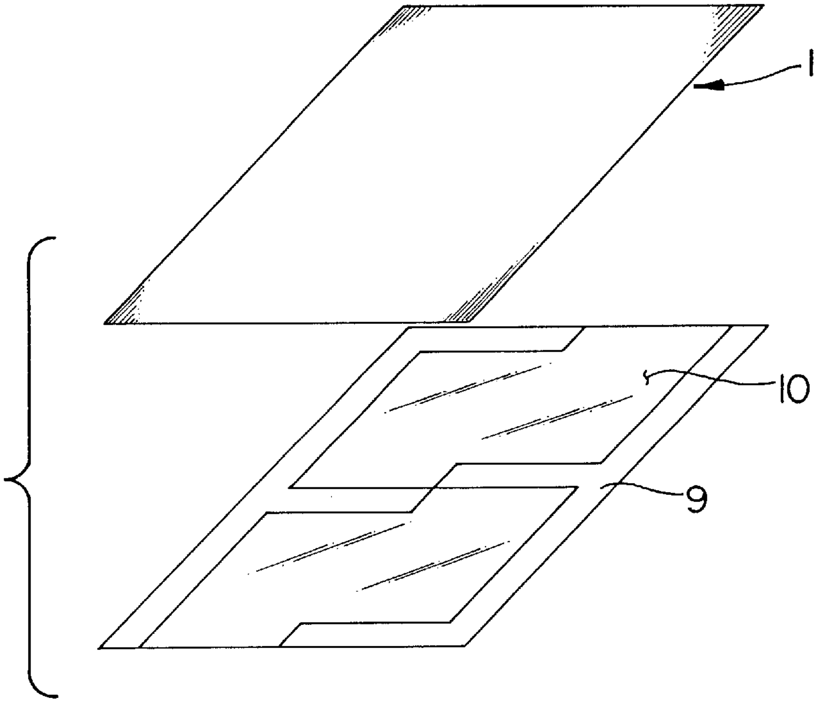
FIG. 3 shows the patterned adhesive release material on the second carrier layer and its relative position to the overlying top layer. The top layer is shown prior to die-cutting of the meter tape labels.

FIG. 3 shows the patterned adhesive-release material 10 on the second carrier layer 9 and its relative position to the overlying top layer. FIG. 3 shows the label sheet 1 prior to die-cutting of the meter tape labels.

Figure 4:
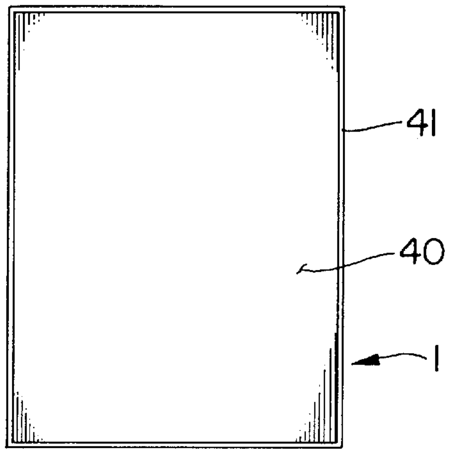
FIG. 4 shows a plan view of a back face of the top layer of the meter tape label sheet, illustrating the area covered by adhesive, leaving an approximately 1/16" adhesive-free area around the perimeter of said top layer.

FIG. 4 shows a plan view of a back face of the top layer of the meter tape label sheet 1, illustrating the area covered by adhesive 40 in a preferred embodiment. Preferably, adhesive 40 is disposed on the back or inner face of the top layer to substantially cover the entire area of the back face, leaving an approximately 1⁄16" adhesive-free border 41 around the perimeter of said sheet 1. This border allows for oozing or "bleeding" of the adhesive when exposed to heat from a laser printer so that adhesive does not bleed over the edge of the sheet when run through the printer.

Figure 5:
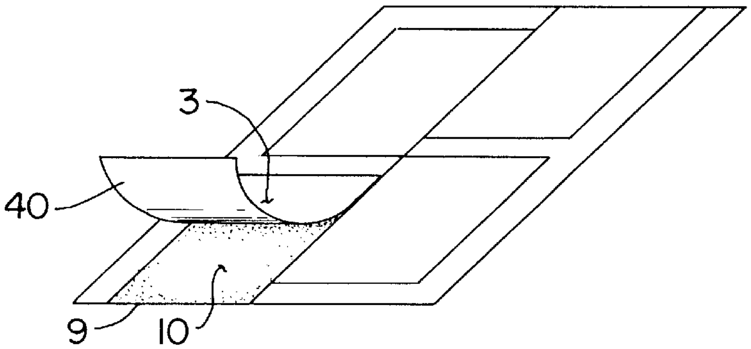
FIG. 5 shows a meter tape label removably affixed to the carrier layer.

FIG. 5 shows meter tape label 3 as being removably affixed to the carrier layer 9. Adhesive 40 is disposed substantially on the entire back surface of label 3 and is removable from adhesive-release material 10 patternly disposed on back layer 9.

Figure 6A:
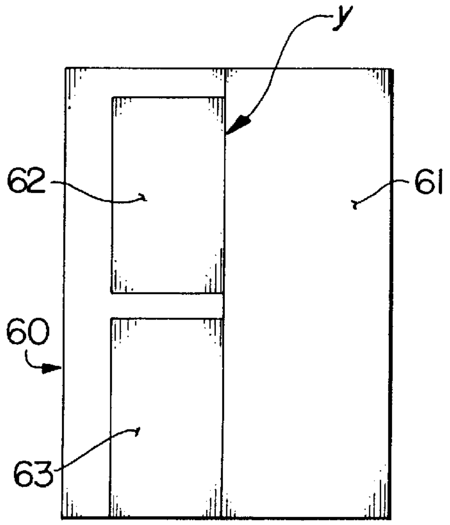
FIGS. 6A and 6B show further embodiments of a meter tape label sheet according to the subject invention wherein each sheet has one half serving as a label layer, and the other half as a carrier layer.
Figure 6B:
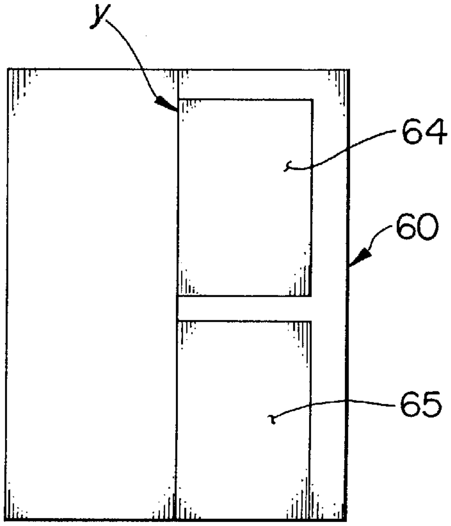

Alternatively, as shown in FIGS. 6A and 6B, an embodiment of the subject invention can include a label sheet 60 wherein one half of the sheet, divided along a substantially central longitudinal axis y, is configured as described herein, i.e., the front sheet has adhesive-backed label tape components 62–63 (on the left-hand embodiment) and label tape components 64–65 (in the right-hand embodiment) die-cut from the top layer; the back layer, which can be patternly coated with an adhesive-release material, serves as a carrier. The other half of the sheet is reversed, i.e., the top layer serves as a carrier having adhesive-release material disposed on the inner face as described herein, and the back layer serves as the label tape, having adhesive material disposed on its inner face. For convenience of reference, the sheets are referred to as having a left half and right half when viewed facing the front face of the sheet. This embodiment can advantageously provide a sheet having instructions or directions for use or other indicia printed on both outward facing faces. Thus, the instructions for use are viewable regardless of the face of the sheet which is being printed.

In one configuration of this embodiment (FIG. 6A), the left half of the label sheet comprises label tapes 62, 63 on the top layer, and the left half of the back layer serves as the carrier (not shown). The right half 61 of the label sheet is an opposing configuration wherein the right half of the top layer serves as the carrier and the right half of the back layer serves as the labels (not shown). When viewed from their outer faces, the front and back layers are identical.

In this embodiment, adhesive-release material can be disposed on the right half of the back face of the top layer. Adhesive-release material can be disposed on substantially the entire surface of the back face of the top layer or can be patternly disposed thereon to conform to the label tape configuration. Labels on the right half of the sheet can be die-cut from the carrier layer. Adhesive material can be disposed over substantially the entire surface of the inner face of the right side of the back layer. Preferably, an adhesive-free border can be provided to preclude oozing or bleeding of hot-melt adhesive from the edges of the sheet, potentially causing damage to the printer. A preferred adhesive-free border is approximately 1⁄16" in width.

As would be readily understood, and as shown in FIG. 6B, the right half of the label sheet can alternatively comprise label tapes 64, 65 on the top layer; the right half of the back layer correspondingly serving as the carrier. The label sheet shown in FIG. 6B comprises a left half, which comprises a carrier layer; and the left half of the back layer comprises label tape components configured in a substantially similar fashion as on the front layer.

Because the front and back layers include a die-cut substantially along the central longitudinal axis, it is important that these die cuts are slightly offset from one another, i.e., not superimposed over one another, so that the page maintains its integrity.

Figure 7:
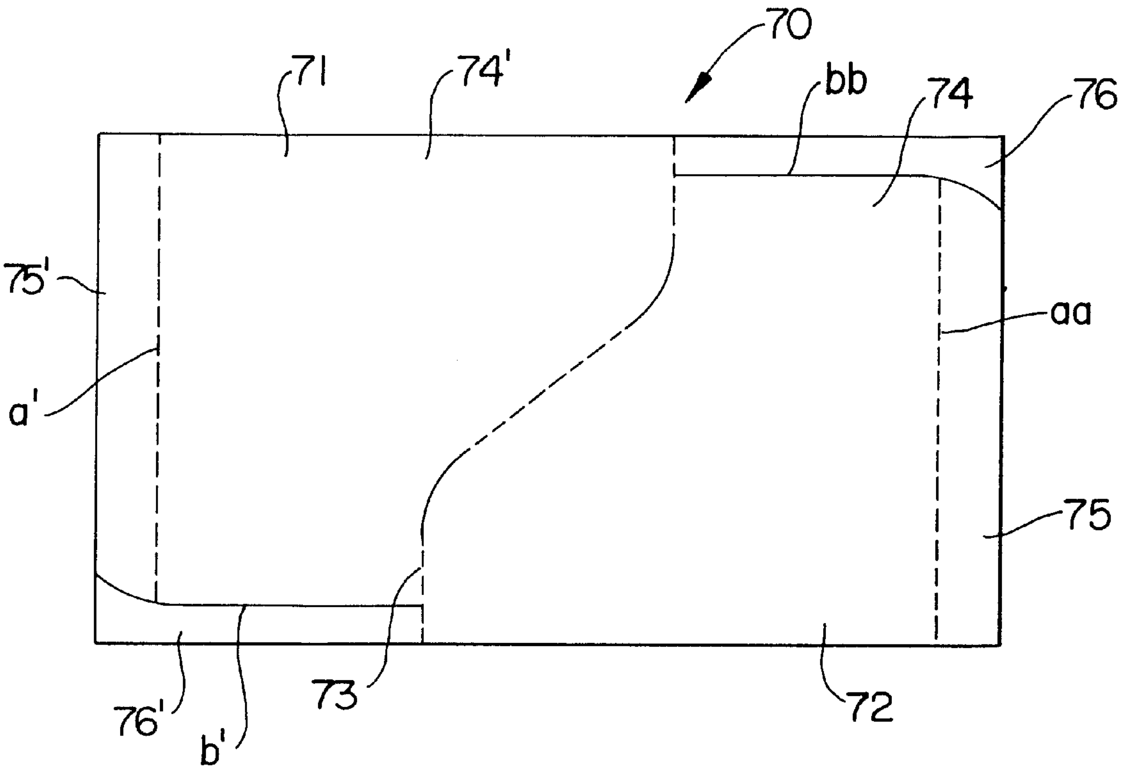
FIG. 7 shows an elevated view of a front face of a top layer of the combination meter tape/address label sheet embodiment, in particular, a dual label configuration illustrating die-cut and fold lines.

A preferred embodiment of the subject combination meter tape/address label sheet 70 is shown in FIG. 7, wherein the preferred embodiment includes a dual label sheet comprising labels 71 and 72 which are adjoined by a curvilinear juncture line 73 which divides the two labels 71 and 72. As shown, it is preferable to provide the labels in an opposing or reverse juxtaposed position so that both labels can be accommodated on a single sheet without waste of surface area of the sheet.

Die-cut and perforation lines are provided on the top layer to define particular areas of the label or borders thereof. In particular, perforation line aa divides a label into a section 74 which is positioned on the front face of an envelope, and tab 75 which wraps around or folds over along perforation line aa so that it becomes positioned on the back face of the envelope. Section 74 and tab 75 remain co-extensive along fold line or perforation line aa.

A die-cut line bb forming a top edge of label 72, can be provided so that label 72 can be separated from a backing layer along border 76. Border 76 also provides a margin of at least 1⁄8" to offset the edge of the printed label so that it can receive a FIM mark flush with its top edge formed by die-cut line bb. The trailing edge of the label is formed by curvilinear line 73 which is preferably a combination of alternating perforation and die-cut lines. The perforations are formed in the front sheet so as to retain integrity of the dual label sheet. The inversely positioned label 71 is shown having corresponding perforation a' and die-cut line b' forming corresponding sections 74', 75' and 76'

Figure 8:
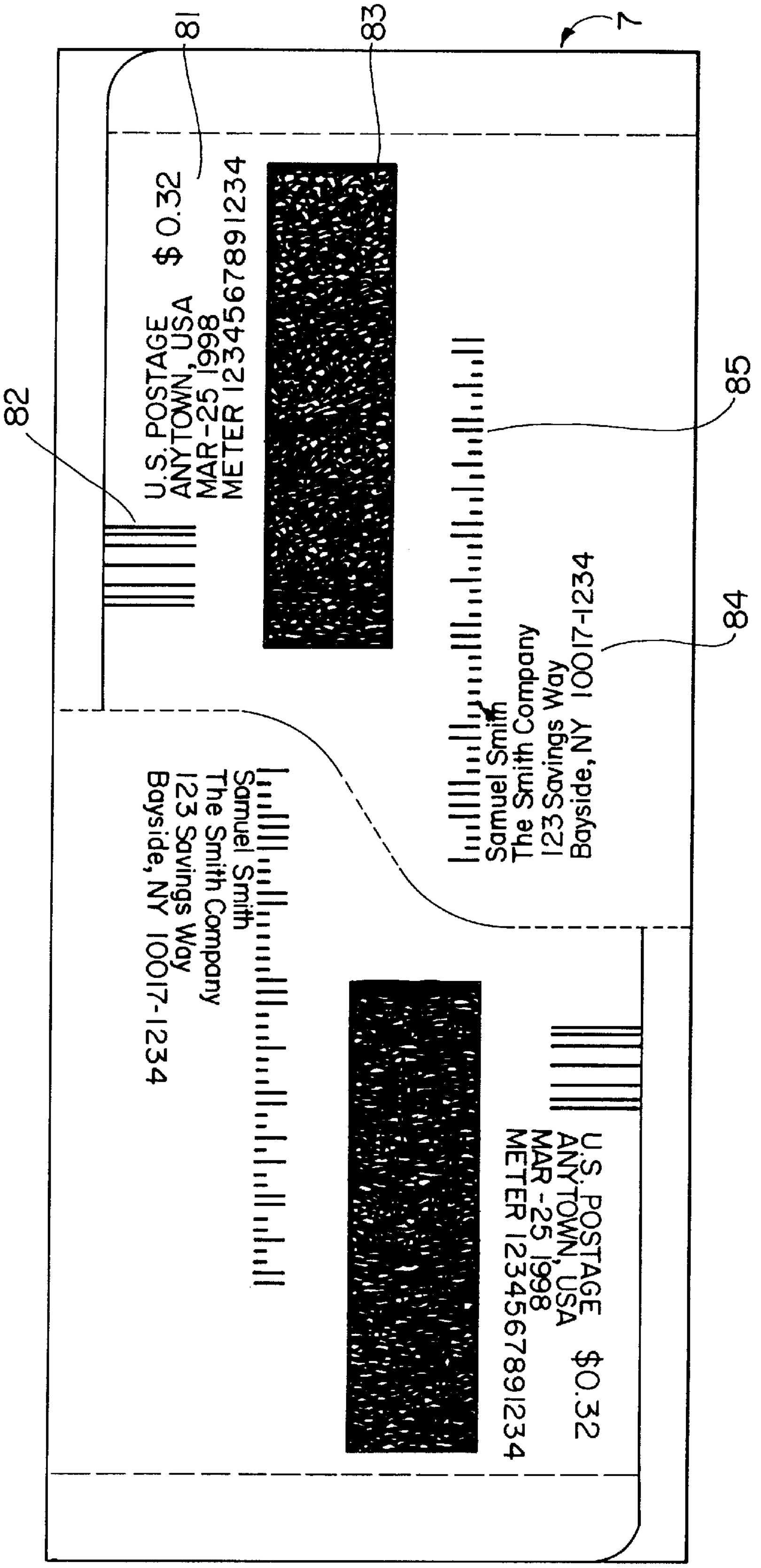
FIG. 8 shows a dual label configuration of a meter tape/address label sheet embodiment as shown in FIG. 7, having information printed thereon.

FIG. 8 shows the embodiment of the combination meter tape/address label sheet 70 as shown in FIG. 7, having postal indicia and address information printed on the front face of the top layer. Shown are postage indicia 81, facing identification mark (FIM) 82, two-dimensional IBI code 83, addressee information 84, and POSTNET bar code 85. For security of postage, a security code is provided in both the addressee label (in particular, the delivery point zipcode) and the two-dimensional IBI bar code or indicia. These codes must match to prevent rejection by automatic postal sorters/readers. Thus, keeping the addressee mailing label and mailing indicia sections as part of a unitary article or section within the mailing label, can prevent mismatch of the security codes provided therein.

In addition, USPS specifications require that the positioning of certain indicia, including a FIM and coded information, have a five percent (5%) variation or less (maximum 5% "skewer") so that automated sorters/readers can process the mailpiece. Thus, a unitary article which provides an alignment means for proper positioning of the indicia can be advantageous.

Figure 9:
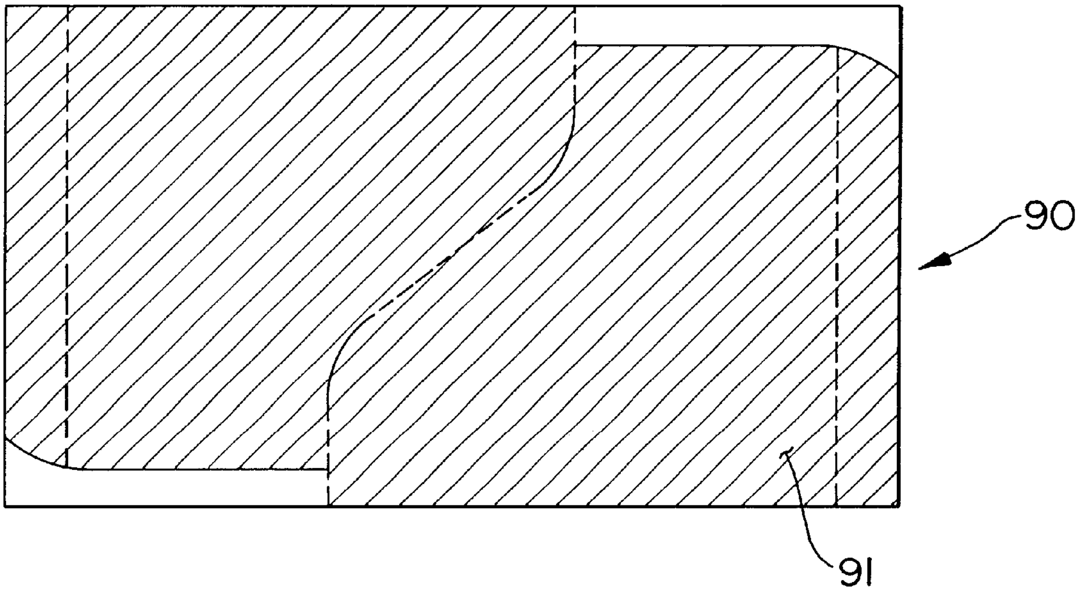
FIG. 9 shows a front or inner face of the back carrier layer of the embodiment shown in FIG. 7, illustrating release material patternly disposed thereon.

FIG. 9 shows the front face of back layer 90 of the subject article, illustrating the pattern of adhesive-release material 91 disposed on said back layer.

Figure 10:
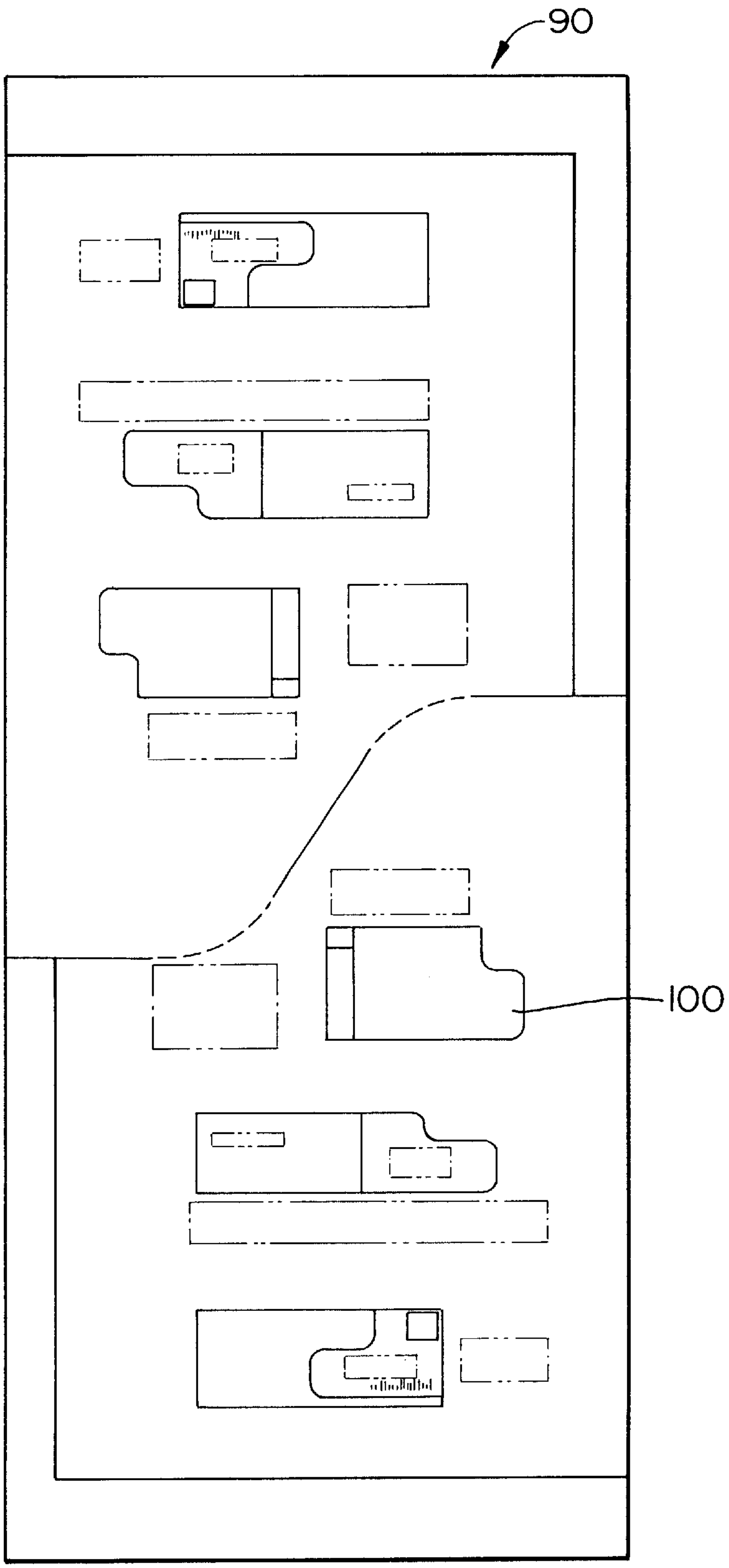
FIG. 10 shows a back face of the back layer of the embodiment shown in FIG. 7, illustrating instructional information pre-printed thereon.

FIG. 10 shows the back face of back layer 90 illustrating instructional information which can be preprinted on that back face.

Figure 11A:
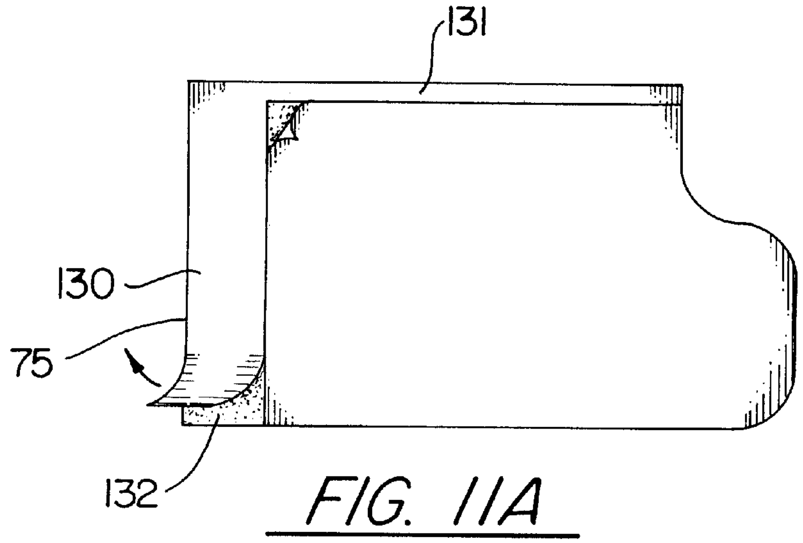
FIGS. 11A–11C show a step-wise method for applying the combination meter tape/address label to an envelope to properly position mailing indicia in accordance with USPS standards.
Figure 11B:
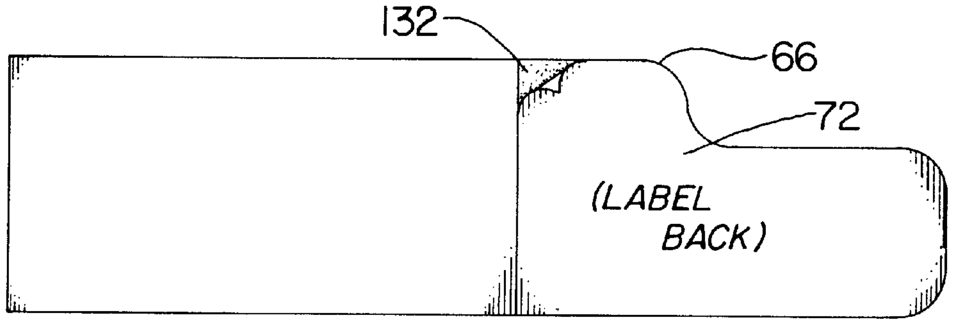
Figure 11C:
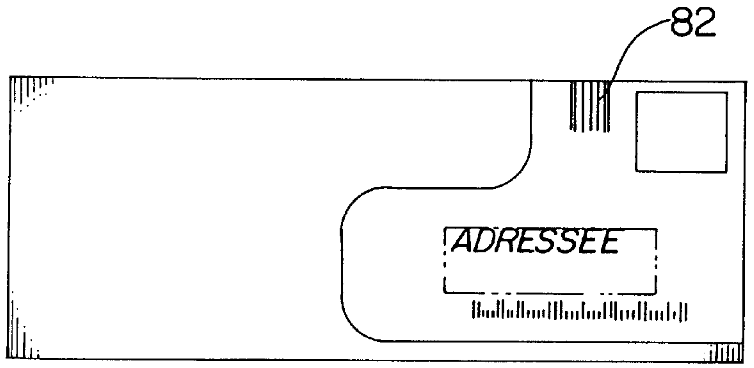

Use of the subject combination meter tape/address label is illustrated in FIGS. 11A–11C. FIG. 11A shows the back layer of the subject article wherein the back layer 110 corresponding to tab 75 is peeled away from tab 75 to expose adhesive 112 on the inner face of the front sheet of the front layer of the article. Removal of back layer 110 also removes top margin 111 of both top and back layers. Tab 75 is then placed behind an envelope so that the meter tape/address label extends from the edge of the envelope and aligns top edge bb with the top edge of the envelope. The carrier layer can then be removed from the meter tape/address label portion or section folded over the envelope to place the meter tape/address label in proper position and in accordance with USPS requirements. In particular, the FIM 82 is placed less than ⅛" from the top edge of the envelope and preferably flush therewith. (FIG. 11C).

The subject postal meter tape label sheet and combination meter tape/address label have a plurality of advantages, including the capability to have indicia printed flush with an edge of a label formed on the sheet. Computer programs for printing indicia on a single label or a plurality of labels on a single sheet can be used to advantageously expedite mailing procedures from a single work station.

Further, the label sheets can be provided on a variety of page sizes and shapes to accommodate a plurality of label tapes. Multiple pages or sheets of the label tapes can be provided in which separable perforations allow the sheets to be separated for use.

In use, the postal meter tape label and combination meter tape/address label can be fed through a standard non-impact printer to print indicia within ½" or less from an edge of the meter label tape.

It should be understood that the examples and embodiments described herein are for illustrative purposes only and that various modifications or changes in light thereof will be suggested to persons skilled in the art and are to be included within the spirit and purview of this application and the scope of the appended claims.

I claim:

1. An adhesive postal meter tape label capable of being printed by a single pass through a non-impact printer, wherein information is provided on the label ⅛" or less from an edge of said postal meter tape label, said label further comprising an address information section integrally formed with a postage indicia section to form a unitary article and a tab for folding over and onto a back face of an envelope to properly align the postage indicia and address information in position on a front face of an envelope.

2. The postal meter tape label of claim 1, wherein the information printed is postal indicia.

3. The postal meter tape label of claim 2, wherein the postal indicia is a facing identification mark.

4. The postal meter tape label of claim 3, wherein the facing identification mark is flush with a top edge of the postal meter tape label.

5. The postal meter tape label of claim 1, wherein said label is provided on a laminated sheet having a plurality of labels thereon.

6. The postal meter tape label of claim 1, wherein said sheet includes an inverted L-shaped border along two intersecting sides of the postal meter tape label.

7. The postal meter tape label of claim 5, wherein the sheet includes an F-shaped border.

8. The postal meter tape label of claim 5, wherein the sheet comprises a front layer and a back layer having die-cut lines which are offset to maintain the integrity of the sheet.

9. The article of claim 1, wherein the postage indicia includes a facing identification mark flush with a top edge of the envelope.

10. The article of claim 1, said article further including a two-dimensional information based indicia mark on the postage indicia section, said two-dimensional mark containing a security code matching a security code contained in a delivery point bar code printed on the address information section.

11. A method for printing postal indicia ⅛" or less from an edge of a postal meter tape label, by a single pass through a non-impact printer so that postage indicia are printed said method comprising:

providing a laminated sheet of claim 1 having a border along at least one edge of said label, such that indicia is printed ⅛" or less from the bordered edge of said label; and passing the sheet through a non-impact printer, which is programmed to print postal indicia.

12. The method of claim 11, wherein said postal meter tape label further includes an address information section integrally formed with the postal meter tape label section to form a unitary postal meter tape/address label.

* * * * *